United States Patent [19]
Standiford et al.

[11] Patent Number: 6,039,574
[45] Date of Patent: Mar. 21, 2000

[54] TIME MONITORING PORTABLE GAME SYSTEM

[76] Inventors: Jocelyn D. Standiford, 5304 Charles St., Racine, Wis. 53402; Candius L. Edgerle, 4019 N. La., Franksville, Wis. 53126

[21] Appl. No.: 09/267,008

[22] Filed: Mar. 11, 1999

[51] Int. Cl.[7] .................................................. G09B 19/12
[52] U.S. Cl. ........................... 434/304; 368/82; 273/237
[58] Field of Search ........................... 368/82, 186, 200; 273/85, 269, 237; 434/300, 304

[56] References Cited

U.S. PATENT DOCUMENTS

| | | | |
|---|---|---|---|
| 4,345,145 | 8/1982 | Norwood . | |
| 5,150,899 | 9/1992 | Kitaue | 273/85 |
| 5,326,104 | 7/1994 | Pease et al. | 273/269 |
| 5,596,554 | 1/1997 | Hagadorn | 368/82 |
| 5,736,720 | 4/1998 | Bell et al. . | |

*Primary Examiner*—Sam Rimell

[57] ABSTRACT

A child educational entertainment device is provided including a housing with a display mounted thereon. Further included is a control mechanism positioned within the housing and adapted to prompt a user to enter an amount of time. Once the time has been entered, a decrementing timer is displayed to count down from the entered amount of time. The control mechanism has at least one mode wherein it is adapted to graphically display the decrementing timer. Further, additional modes are included for entertainment purposes.

9 Claims, 4 Drawing Sheets

TIME MONITORING PORTABLE GAME SYSTEM

BACKGROUND OF THE INVENTION

1. Field of the Invention

The present invention relates to electronic games and more particularly pertains to a new time monitoring portable game system for entertaining a child within a vehicle and further affording a better appreciation of a duration of a trip.

2. Description of the Prior Art

The use of electronic games is known in the prior art. More specifically, electronic games heretofore devised and utilized are known to consist basically of familiar, expected and obvious structural configurations, notwithstanding the myriad of designs encompassed by the crowded prior art which have been developed for the fulfillment of countless objectives and requirements.

Known prior art electronic games include U.S. Pat. No. 4,618,927; U.S. Pat. No. 2,274,811; U.S. Pat. No. 3,230,383; U.S. Pat. No. 3,735,500; U.S. Pat. No. 5,044,961; and U.S. Pat. Des. 387,383 which are each incorporated herein by reference.

In these respects, the time monitoring portable game system according to the present invention substantially departs from the conventional concepts and designs of the prior art, and in so doing provides an apparatus primarily developed for the purpose of entertaining a child within a vehicle and further affording a better appreciation of a duration of a trip.

SUMMARY OF THE INVENTION

In view of the foregoing disadvantages inherent in the known types of electronic games now present in the prior art, the present invention provides a new time monitoring portable game system construction wherein the same can be utilized for entertaining a child within a vehicle and further affording a better appreciation of a duration of a trip.

The general purpose of the present invention, which will be described subsequently in greater detail, is to provide a new time monitoring portable game system apparatus and method which has many of the advantages of the electronic games mentioned heretofore and many novel features that result in a new time monitoring portable game system which is not anticipated, rendered obvious, suggested, or even implied by any of the prior art electronic games, either alone or in any combination thereof.

To attain this, the present invention generally comprises a housing having a planar rectangular front face, a planar rectangular rear face and a thin periphery formed therebetween. Such periphery is defined by a short top edge, a short bottom edge and a pair of elongated side edges. The rear face has a battery compartment formed therein with a removable cover for allowing selective access to batteries stored therein. One of the side edges has a port formed therein adjacent to the bottom edge for releasably receiving a first end of an adapter. As shown in FIG. 2, the second end of the adapter has a vehicular cigarette lighter plug mounted thereon for being connected to a cigarette lighter port of a vehicle for receiving power therefrom. As shown in FIG. 1, a square liquid crystal primary display is mounted on the front face of the housing and spaced from the top edge and the bottom edge thereof. The liquid crystal primary display has a light for illuminating the same upon the actuation thereof. Associated therewith is a light emitting diode digital display mounted on the front face of the housing adjacent to the top edge thereof. For reasons that will soon become apparent, the digital display is adapted for displaying numerals representative of a clock. FIG. 1 shows an actuation toggle switch mounted on the front face of the housing for actuating the device upon the depression thereof. Also mounted on the front face of the housing is a light actuator button that is positioned between the light emitting diode digital display and the liquid crystal primary display. The light actuator button is adapted for actuating the light of the liquid crystal primary display upon the depression thereof. Next provided is a pause button mounted on the front face of the housing. Further buttons include a clear button and a select button mounted on the front face of the housing. Positioned between the liquid crystal primary display and the bottom edge of the housing is a plurality of direction buttons mounted on the front face of the housing. Finally, an enter button is mounted on the front face of the housing and positioned between the direction buttons. Also included is a control means positioned within the housing and connected between the displays, switch, and buttons. In use, the control means, upon the actuation of the device, is adapted to prompt a user to enter an amount of time. This is accomplished via the direction buttons with the subsequent depression of the enter button. Once the enter button has been depressed, a decrementing timer is displayed on the digital display which counts down from the entered amount of time. Any time during use, the control means may be reset upon the simultaneous depression of the clear button and the enter button. When reset, the control means again prompts the user to enter the amount of time by the aforementioned method. It should be noted that the control means has a plurality of modes of operation each of which employs the display in a unique manner. During operation, the control means serves to switch between each of the modes of operation by the depression of the select button. A first one of the modes of operation will now be set forth. During such mode, the control means is adapted to display a matrix on the primary display with a number of columns and rows to define a plurality of spaces. The number of columns is equal to a number of hours included with the entered amount of time. Each column is representative of one of the hours. The spaces of each of the four rows are each representative of a quarter of an hour. In the preferred embodiment, the spaces of each column have a common unique color associated therewith. During operation in the first mode, the spaces of each column are illuminated with the associated color upon the cessation of each quarter of an hour increment, as indicated by the decrementing timer depicted on the digital display. As an option, the decrementing timer may be paused upon the depression of the pause button and further restarted upon the subsequent depression of the pause button. The remaining modes of operation of the control means share many common characteristics. Similar to while in the first mode, the control means, in the remaining modes, displays a matrix on the primary display with a number of columns and rows to define a plurality of spaces each with an object therein. At any time during operation, the control means allows one of the spaces to be selected via the direction buttons. Once selected, the space may be cleared from the primary display upon the depression of the enter button. The control means transmits a sound signal to the speaker when the enter button is depressed. Distinguishing each of the remaining modes is the object within each of the spaces. For example, in a second mode, a plurality of alphabetic letters are positioned in the spaces, as shown in FIG. 3D. Further, in a third mode, either a color or a shape is positioned in each of the spaces, as shown in FIG. 3C. FIG. 3B shows each of the spaces including a graphic representation of an object commonly seen along side of a road. Finally, in a fourth mode, the spaces each include a graphic representation of a person carrying out an errand. This fourth mode does not have a reference drawing as FIGS. 3A–D.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new time monitoring portable game system apparatus and method which has many of the advantages of the electronic games mentioned heretofore and many novel features that result in a new time monitoring portable game system which is not anticipated, rendered obvious, suggested, or even implied by any of the prior art electronic games, either alone or in any combination thereof.

It is another object of the present invention to provide a new time monitoring portable game system which may be easily and efficiently manufactured and marketed.

It is a further object of the present invention to provide a new time monitoring portable game system which is of a durable and reliable construction.

An even further object of the present invention is to provide a new time monitoring portable game system which is susceptible of a low cost of manufacture with regard to both materials and labor, and which accordingly is then susceptible of low prices of sale to the consuming public, thereby making such time monitoring portable game system economically available to the buying public.

Still yet another object of the present invention is to provide a new time monitoring portable game system which provides in the apparatuses and methods of the prior art some of the advantages thereof, while simultaneously overcoming some of the disadvantages normally associated therewith.

Still another object of the present invention is to provide a new time monitoring portable game system for entertaining a child within a vehicle and further affording a better appreciation of a duration of a trip.

Even still another object of the present invention is to provide a new time monitoring portable game system that includes a housing with a display mounted thereon. Further included is a control mechanism positioned within the housing and adapted to prompt a user to enter an amount of time. Once the time has been entered, a decrementing timer is displayed to count down from the entered amount of time. The control mechanism has at least one mode wherein it is adapted to graphically display the decrementing timer. Further, additional modes are included for entertainment purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
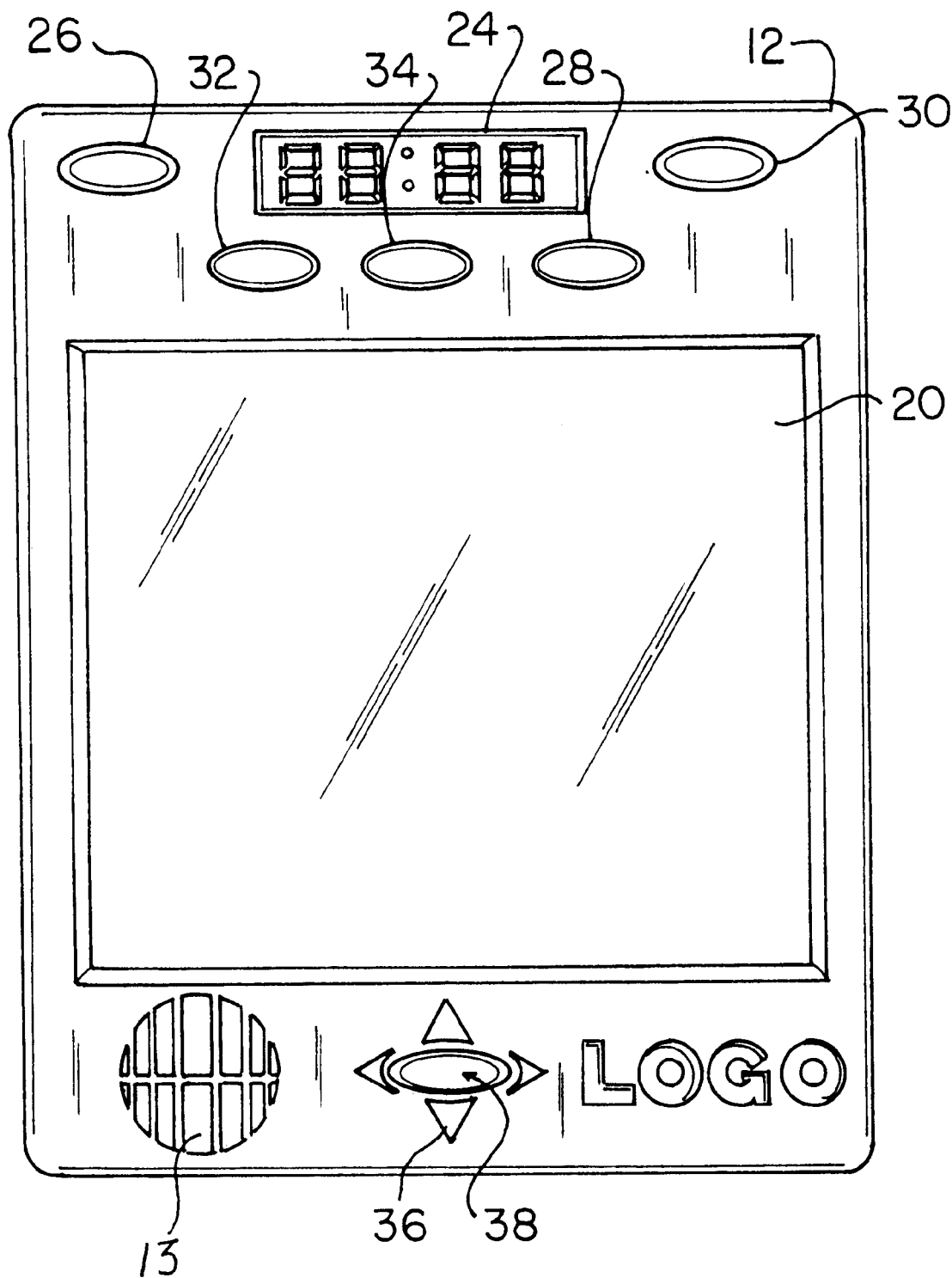
FIG. 1 is a front view of a new time monitoring portable game system according to the present invention.
Figure 2:
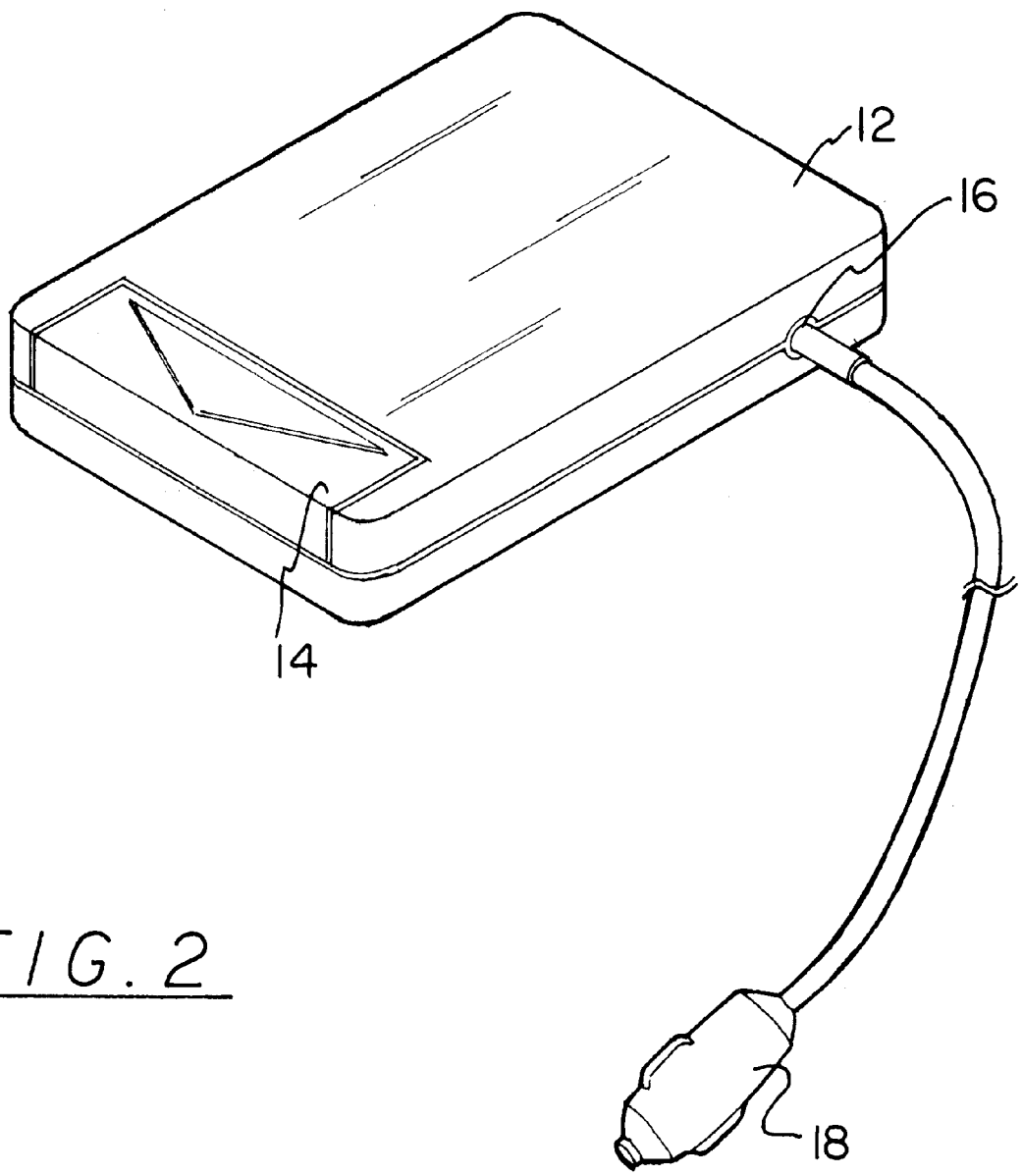
FIG. 2 is a rear perspective view of the present invention.
Figure 3A:
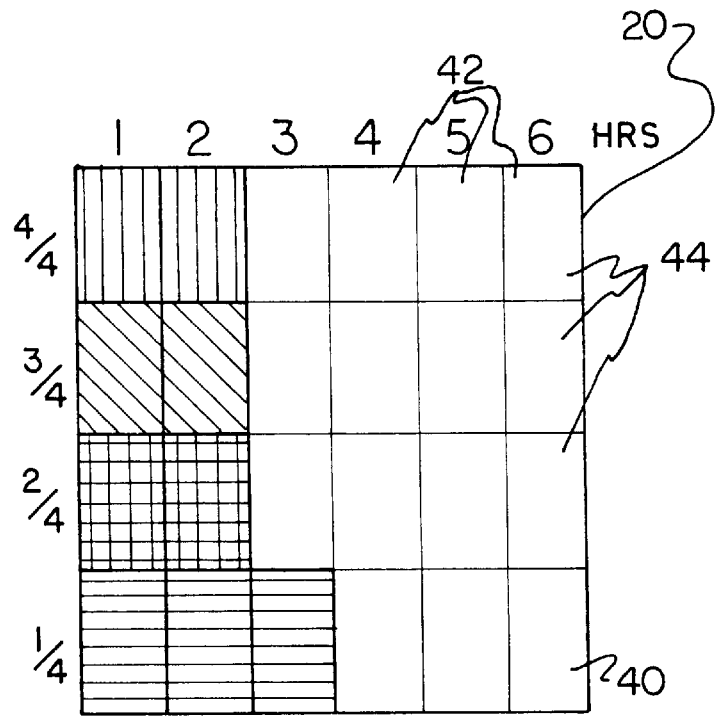
FIGS. 3A–D are front views of the display while the control means is in the various modes of operation.

With reference now to the drawings, and in particular to FIGS. 1 through 3 thereof, a new time monitoring portable game system embodying the principles and concepts of the present invention and generally designated by the reference numeral 10 will be described.

The present invention, designated as numeral 10, includes a housing 12 having a planar rectangular front face, a planar rectangular rear face and a thin periphery formed therebetween. Such periphery is defined by a short top edge, a short bottom edge and a pair of elongated side edges. The rear face has a battery compartment 14 formed therein with a removable cover for allowing selective access to batteries stored therein. One of the side edges has a port 16 formed therein adjacent to the bottom edge for releasably receiving a first end of an adapter. As shown in FIG. 2, the second end of the adapter has a vehicular cigarette lighter plug 18 mounted thereon for being connected to a cigarette lighter port of a vehicle to receive power therefrom. Ideally, the port is further equipped to receive a 12V power adapter for use with conventional alternating current receptacles. Further, it is preferred that the cord be at least 5 feet in length, or sufficient to reach into a rear seat of a vehicle.

As shown in FIG. 1, a square liquid crystal primary display 20 is mounted on the front face of the housing and spaced from the top edge and the bottom edge thereof. The liquid crystal primary display has a light for illuminating the same upon the actuation thereof. Associated therewith is a light emitting diode digital display 24 mounted on the front face of the housing adjacent to the top edge thereof. For reasons that will soon become apparent, the digital display is adapted for displaying numerals representative of a clock.

FIG. 1 shows an actuation toggle switch 26 mounted on the front face of the housing for actuating the device upon the depression thereof. Also mounted on the front face of the housing is a light actuator button 28 that is positioned between the light emitting diode digital display and the liquid crystal primary display. The light actuator button is adapted for actuating the light of the liquid crystal primary display upon the depression thereof.

Next provided is a pause button 30 mounted on the front face of the housing. The pause button is preferably positioned on a side of the digital display opposite the actuation toggle switch, as shown in FIG. 1. Further buttons include a clear button 32 mounted on the front face of the housing and positioned between the liquid crystal primary display and the top edge of the housing. Associated therewith is a select button 34 mounted on the front face of the housing and positioned between the liquid crystal primary display and the top edge of the housing.

Positioned between the liquid crystal primary display and the bottom edge of the housing is a plurality of arrow-shaped direction buttons 36 mounted on the front face of the housing. Finally, an enter button 38 is mounted on the front face of the housing and positioned between the direction buttons.

Also included is an unillustrated control means positioned within the housing and connected between the displays, switch, and buttons. It should be noted that the control means may include a microcontroller connected to the aforementioned components and which is configured to carry out the functions to be set forth hereinbelow. In the alternative, a CPU may be employed with programming code adapted to carry out the functions set forth hereinafter.

In use, the control means, upon the actuation of the device, is adapted to prompt a user to enter an amount of time. This is accomplished via the direction buttons with the subsequent depression of the enter button. Specifically, the left and right direction buttons which represent hours and minutes, respectively, may be depressed while the up and down direction buttons may be used to increase and decrease the amount of time to be entered. Once the enter button has been depressed, a decrementing timer is displayed on the digital display which counts down from the entered amount of time. Any time during use, the control means may be reset upon the simultaneous depression of the clear button and the enter button. When reset, the control means again prompts the user to enter the amount of time by the aforementioned method.

It should be noted that the control means has a plurality of modes of operation each of which employs the display in a unique manner. During operation, the control means serves to switch between each of the modes of operation by the depression of the select button. It should be noted that a user may operate the device in each of the modes simultaneously by simply switching between them. In each of the modes, the decrementing timer continues to be displayed on the digital display during operation and switching between each of the modes.

A first one of the modes of operation will now be set forth. During such mode, the control means is adapted to display a matrix 40 on the primary display with a number of columns 42 and rows 44 to define a plurality of spaces. The number of columns is equal to a number of hours included with the entered amount of time. Each column is representative of one of the hours. The spaces of each of the four rows are each representative of a quarter of an hour. In the preferred embodiment, the spaces of each column have a common unique color associated therewith. Ideally, such colors include blue, yellow, green, and red from bottom to top.

During operation in the first mode, the spaces of each column are illuminated with the associated color upon the cessation of each quarter of an hour increment, as indicated by the decrementing timer depicted on the digital display. In other words, the pixels of the space which is normally blank change to the appropriate color. By this operation, a child is afforded a better appreciation of how long a trip is scheduled to take. As an option, the decrementing timer may be paused upon the depression of the pause button and further restarted upon the subsequent depression of the pause button. This accommodates for when the vehicle has been stopped and is no longer moving.

The remaining modes of operation of the control means share many common characteristics. Similar to while in the first mode, the control means, in the remaining modes, displays a matrix on the primary display with a number of columns and rows to define a plurality of spaces each with an object therein. At any time during operation, the control means allows one of the spaces to be selected via the direction buttons. Once selected, the space has a unique color and the object therein may be cleared from the primary display upon the depression of the enter button. It should be noted that when the object is removed from the space, a portion of a background picture is displayed. As such, upon each of the spaces being cleared, the background picture is seen in whole and a congratulations is sounded by a speaker 13. Such background picture preferably includes a clock face. It should be noted that the control means transmits a sound signal to the speaker 13 when the enter button is depressed to further provide positive reinforcement.

Figure 3B:
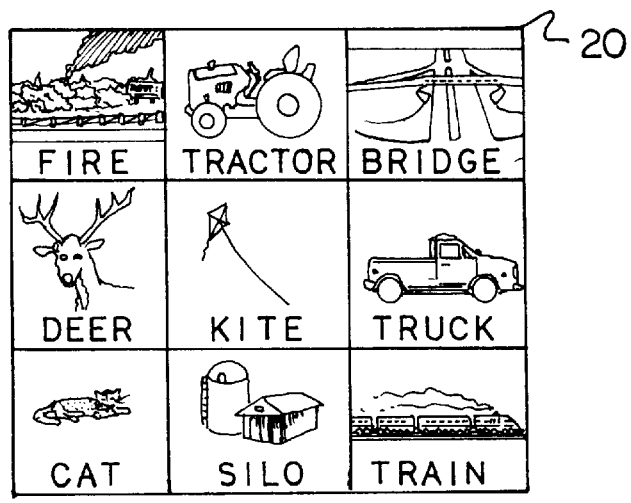
Figures 3C, 3D:
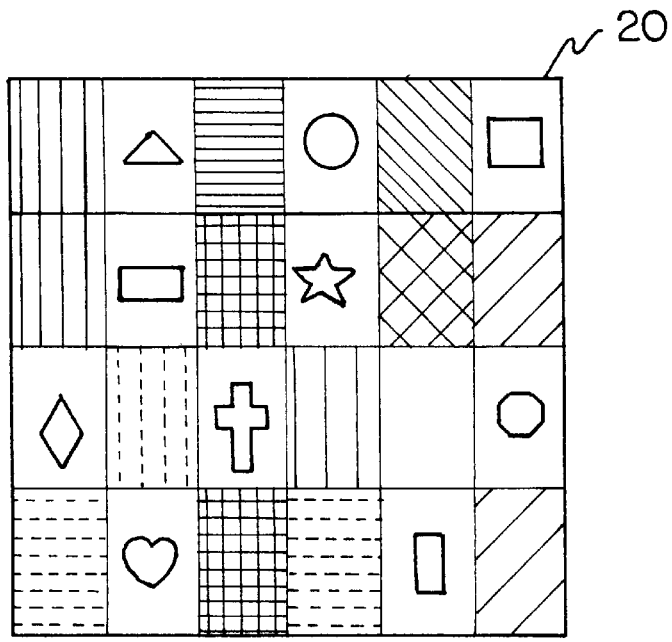

Distinguishing each of the remaining modes is the object within each of the spaces. For example, in a second mode, a plurality of alphabetic letters are positioned in the spaces, as shown in FIG. 3D. Further, in a third mode, either a color or a shape is positioned in each of the spaces, as shown in FIG. 3C. FIG. 3B shows each of the spaces including a graphic representation of an object commonly seen along side of a road. Finally, in a fourth mode, the spaces each include a graphic representation of a person carrying out an errand. Due to the similarity with the third mode, the fourth mode has not been shown in the Figures. As an option, additional modes may be included which are similar to the foregoing modes with the exception of the level of play. For example, advanced modes may be included for encouraging players to find more obscure or interacting objects.

In order to use the present invention, a player may pick a mode and find surrounding objects which match the objects within the spaces. For example, in the second mode, a player would search for objects which start with a letter listed within the space. In the third mode, a player would attempt to find objects which have similar colors or shapes. Finally, in the remaining modes, the player would search for specific objects and await certain errands to be carried out as indicated by the graphic representations within the spaces. At any time, a player may employ the first mode to use the graphic representation of time to gain a better appreciation of a duration of a trip within a vehicle.

Hand-held electronic timer/educational device helps children develop a realistic concept of time when traveling or anxiously awaiting an activity, gives kids a colorful visual representation of time remaining, makes travel less stressful for everyone and prevents kids from asking, "How much longer?"

The shell of device would be produced from injection-molded plastic and would measure 5" wide by 6½" long, and 1" thick. Battery-operated device could also be powered via vehicle cigarette lighter adapter or standard 110-volt plug (DC adapter). The cords would be approximately 5 feet long. Front of device would feature a 4½" by 4½" LCD screen, above which would be positioned (from left to right) an "on/off" toggle switch, an LCD countdown timer, and a "pause" button. Below the LCD timer would be (from left to right) a "clear" button, "select" button, and a "light" activation button for night use. Four arrow buttons (up, right, down, and left) surrounding an "enter" button would be positioned below the LCD screen and would allow movement of an on-screen cursor. A speaker would be located on the lower left of the device and the logo, "How Much Longer?", in the lower right of the device. NOTE: all buttons push in, except for the "on/off" which slides back and forth, and would slide with effort for less chance of the button accidentally getting turned off. The device would feature several activity modes.

The "clockface" mode: When you slide the "on/off" button on, the LCD screen will display the whimsical "Mr. Clockface" character and his voice will say, "How Much Longer?"

The "timer" mode: You push the "select" button and the LCD screen will be blank, until a parent/child programs in the length of waiting time. You could program up to approximately 18 hours. At this time we don't have the technical expertise to give the exact hours, you could possible go up to 24 hours, depending on the device's graphical sizing. By using the arrow buttons, the LCD count down timer will be set for the amount of hours and minutes of waiting time. By pressing the "enter" button, the LCD screen will display a grid or chart, with columns corresponding to the amount of waiting time as programmed into the device. Each column would represent 1 hour and would be divided into four 15-minute increments of time. At first, the graph would appear with a light blue colored background with black column lines. Each hour would gradually fill in with a primary color (the columns would be in the order of red, orange, yellow, green, blue, purple, and the colors would repeat as needed according the number of hours programmed in), to give children a larger visual display and representation of passing time. For example: We are taking a 5½ hour trip. You would first slide the "on/off" toggle switch (we are at Mr. Clockface mode), then press the "select" button (we are at the "timer" mode), then using the arrow buttons you hold down the left arrow button (representing hours) and push the upper arrow button to accelerate up to your 5 hours (note: you could use the down arrow if you went too far), then release the left arrow button. You would then set the minutes by holding down the right arrow button and pushing the upper arrow button to accelerate up to 30 minutes, then release the right arrow button. You then press the "enter" button and the LCD screen will display a grid of five and one-half columns which have been divided into the appropriate number of 15-minute increments. When you are ready to start driving, you press the "enter" button again, and your LCD countdown timer starts decreasing and at the same time the grid would gradually start filling up with color. If the situation arises that you need to stop driving (for gas, rest stop, or motel), you may press the "pause" button to temporarily stop the function of the Countdown Timer and Grid. (NOTE: if you will be stopping for an extended period, for example overnight, you may want to plug the device into an electrical outlet using the optional 110-volt plug, so as not to wear down the batteries.) When you resume your travels, you press the "pause" button again, and the function starts up once more. At 5½ hours, the grid will have 5 columns full of colors and ½ of a sixth column with color, and the whimsical voice of Mr. Clockface says, "Time's Up". (Note: if it is night time driving, you may press the "light" button and both LCD screens will light up.) If for any reason you want to stop the countdown function permanently during its operation, you hold down the "clear" button and then press the "enter" button, and then release both.

NOTE: While this countdown process is happening, you have the capability of playing educational activities by pressing the "select" button and that activity screen will come into view. (You press "select" once to enter the "ABC" mode, twice for "Find or Think" mode, three times for "Search" mode, four times for "Advanced Search" mode, five times for "Errands" mode, and if you press the sixth time you are back to your "timer" mode, which has continued it's function while you have played with the buttons and have played with the activities.) You will be able to switch back and forth from an activity, back to the "timer" mode, without interrupting the play of that activity, by just pressing the "select" button. The two ways the activity will end is by the completion of the game, or by holding down the "clear" button and then pressing the "enter" button, and then releasing both.

The "ABC" mode: The LCD screen shows a grid broken into squares, six across and five down, making thirty squares. Each square would have a capitalized letter, going from left to right, in alphabetical order. The last row would have only the letters Y and Z, with four extra spaces. Each column would be colored in the order of red, orange, yellow, green, blue, and purple (just like it is in the "timer" mode). A cursor will be in view, in the upper left hand square. Using the "arrow" buttons you are able to move the cursor. You can play the game two ways. You have to find an object on the road that starts with a chosen letter (ex. A for apple tree), or you can actually find that alphabet letter on objects you see along the roadside (ex. S for the letter in the word STOP, in a stop sign), while traveling or any place you are waiting for a countdown of time (ex. C for the letter in chair in the living room or T for the letter in train at the train station). (You choose to play the game in alphabetical order or random order.) When you find that letter, using your "arrow" buttons, you move the cursor to that letter, then press the "enter" button, which will remove that letter square, a beep will sound, and part of "Mr. Clockface" will appear in that spot. Once all letters have been found and removed, the whole "Mr. Clockface" will appear and his voice will say, "Good Job". (The four extra spaces noted above reveals the appropriate portion of "Mr.Clockface", at the beginning of the game.)

The "Find or Think" mode: The LCD screen is broken into squares, five across and five down, making 25 squares. From left to right the squares will contain (color and shapes): red, triangle, blue, circle, green, square, black, cross, yellow, star, orange, diamond, white, vertical rectangle, brown, heart, pink, octagon, gray, horizontal rectangle, gold, oval, silver, pentagon, and purple. The cursor appears in the upper left hand square. You search for colors or shapes on the road or any place you are waiting for the countdown of time (ex. green for grass or blue for carpet). Using the "arrow" buttons you are able to move the cursor. When you find a color or shape (in random order), using your "arrow" buttons, you move the cursor to that square, then press the "enter" button, which will remove that square, a beep will sound, and a part of "Mr. Clockface" will appear in that spot. Once all squares have been found and removed, the whole "Mr. Clockface" will appear and his voice will say, "Good Job". (NOTE: For the squares that are a color, that square will visually be that color and that color will be spelled out within the square in black letters. For the squares with shapes, the background will be a light blue and the shape will be drawn in black.)

The "Search" mode: The LCD screen shows a grid broken into squares, five across and five down, making twenty-five total squares. Each square would have a light blue colored background with a picture drawn in black. A cursor will be in view in the upper left hand square. The twenty-five pictures would be items children may see when traveling and watching the passing landscape such as bird, cow, overpass, semi, barn, or church. When you spot an object on the roadside that matches one of the squares (in random order), use the "arrow" buttons to move the cursor to the matching square, then press the "enter" button which will remove that picture square, a beep will sound and a part of "Mr. Clockface" will appear in that spot. Once all pictures have been found and removed the whole "Mr. Clockface" will appear and his voice will say, "Good Job!".

The "Advanced Search" mode: The information is the same as for the above (E. "Search" mode) except that children would search for 25 objects that are more difficult to find, such as: bird on wire, railroad crossing sign, men at work, airplane, fire hydrant, and kite.

The "Errands" mode: The LCD screen shows a grid broken into squares, six across and five down, making thirty squares. Each square would have a light blue colored background with pictures drawn in black. The pictures would represent different types of stops or errands that a parent/caretaker may have to make in a day (for example: a bag for groceries, dollar sign $ for bank, gas pump for getting gas at gas station, toothbrush and paste for dentist, stethoscope for doctor, etc. . . . ). The cursor would be in view in the upper left hand square. Using the "arrow" buttons, you move the cursor to the squares you want to eliminate from the LCD screen (because you won't be making the total of thirty stops). To remove those unwanted errands, use the "arrow" buttons to move the cursor, then press "enter" button, to remove each square. (As in all modes, the beep sound will go off each time a square is removed.) The only squares left should be your stops, with the rest of the LCD screen revealing portions of "Mr. Clockface". As your selected errands are completed, again move the cursor with the "arrow" buttons, press the "enter" button, which will remove each errand, a beep will sound, and more of "Mr. Clockface" will appear. When all errands are completed, the whole "Mr. Clockface" will appear and his voice will say, "Good Job".

We have noted above, instructions to temporarily stop the Countdown Timer and Grid from functioning, and how to permanently stop a game. When the device is in operation, the "on/off" toggle switch has been slide into the "on" position. If you slide the "on/off" toggle switch into the "off" position, the device will permanently be turned off and any memory that has been stored in Countdown and activities/games will be erased.

With respect to our invention above, we realize that there may be a need to make variations in size, material, shape, form, colors, function and manner of operation internally or externally, assembly and use, position of buttons, maximum hours programmable for countdown timer and grid, or new ideas for games or home use. In addition, there may be optional modes with different formats. There could be different/separate devices with varying levels of difficulty for age appropriateness: one geared towards toddlers, preschoolers, elementary, or more advanced ages.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A child educational entertainment device comprising, in combination:

a housing having a planar rectangular front face, a planar rectangular rear face and a thin periphery formed therebetween defined by a short top edge, a short bottom edge and a pair of elongated side edges, the rear face having a battery compartment formed therein with a removable cover for allowing selective access to batteries stored therein, one of the side edges having a port formed therein adjacent to the bottom edge for releasably receiving a first end of an adapter the second end of which has a vehicular cigarette lighter plug mounted thereon for being connected to a cigarette lighter port of a vehicle for receiving power therefrom;

a square liquid crystal primary display mounted on the front face of the housing and spaced from the top edge and the bottom edge thereof, the liquid crystal primary display having a light for illuminating the same upon the actuation thereof;

a light emitting diode digital display mounted on the front face of the housing adjacent to the top edge thereof for displaying numerals representative of a clock;

an actuation toggle switch mounted on the front face of the housing for actuating the device upon the depression thereof;

a light actuator button mounted on the front face of the housing for actuating the light of the liquid crystal primary display upon the depression thereof;

a pause button mounted on the front face of the housing;

a clear button mounted on the front face of the housing;

a select button mounted on the front face of the housing;

a plurality of direction buttons mounted on the front face of the housing and positioned between the liquid crystal primary display and the bottom edge of the housing;

an enter button mounted on the front face of the housing and positioned between the direction buttons;

a speaker mounted on the front face of the housing for emitting sound signals upon the receipt thereof; and control means positioned within the housing and connected between the displays, switch, and buttons, the control means, upon the actuation of the device, adapted to prompt a user to enter an amount of time via the direction buttons with the subsequent depression of the enter button whereafter a decrementing timer is displayed on the digital display counting down from the entered amount of time, wherein the control means is reset and again prompt the user to enter the amount of time upon the simultaneous depression of the clear button and the enter button;

said control means having a plurality of modes of operation and adapted to switch between each of the modes of operation by the depression of the select button, the modes of operation including:

a first mode wherein the control means is adapted to display a matrix on the primary display with a number of columns and rows to define a plurality of spaces, the number of columns equal to a number of hours included with the entered amount of time and each column being representative of one of the hours, the spaces of each of the four rows each representative of a quarter of an hour and having a unique color associated with the row, wherein the spaces of each column are illuminated with the associated color upon the cessation of each quarter of an hour increment as indicated by the decrementing timer depicted on the digital display, wherein the decrementing timer may be paused upon the depression of the pause button and further restarted upon the subsequent depression of the pause button, a second mode wherein the control means is adapted to display a matrix on the primary display with a number of columns and rows to define a plurality of spaces each having a unique alphabetical letter positioned therein, wherein any one of the spaces may be selected via the direction buttons after which the same may be cleared from the primary display upon the depression of the enter button, wherein the control means transmits a sound signal to the speaker when the enter button is depressed, a third mode wherein the control means is adapted to display a matrix on the primary display with a number of columns and rows to define a plurality of spaces each having at least one of a shape and a color positioned therein, wherein any one of the spaces may be selected via the direction buttons after which the same may be cleared from the primary display upon the depression of the enter button, wherein the control means transmits a sound signal to the speaker when the enter button is depressed, a fourth mode wherein the control means is adapted to display a matrix on the primary display with a number of columns and rows to define a plurality of spaces each having unique picture positioned therein, wherein any one of the spaces may be selected via the direction buttons after which the same may be cleared from the primary display upon the depression of the enter button, wherein the control means transmits a sound signal to the speaker when the enter button is depressed, and a fifth mode wherein the control means is adapted to display a matrix on the primary display with a number of columns and rows to define a plurality of spaces each having unique errand positioned therein, wherein any one of the spaces may be selected via the direction buttons after which the same may be cleared from the primary display upon the depression of the enter button, wherein the control means transmits a sound signal to the speaker when the enter button is depressed.

2. A child educational entertainment device comprising:

a housing;

a display mounted on the housing;

control means positioned within the housing and adapted to prompt a user to enter an amount of time whereafter a decrementing timer is displayed to count down from the entered amount of time;

said control means having at least one mode wherein the control means is adapted to graphically display the decrementing timer; and wherein the control means is adapted to display a matrix on the display with a number of columns and rows to define a plurality of spaces, the number of columns being equal to a number of hours included with the entered amount of time and each column being representative of one of the hours, the spaces of each of the rows each representative of a portion of an hour, wherein the spaces of each column are illuminated upon the cessation of each portion of an hour as indicated by the decrementing timer.

3. A child educational entertainment device as set forth in claim 2 wherein the decrementing timer may be paused upon the depression of a pause button.

4. A child educational entertainment device as set forth in claim 2 wherein each column of spaces has a common unique color.

5. A child educational entertainment device as set forth in claim 2 wherein said control means has additional modes of operation wherein during each mode the control means is adapted to display said matrix wherein said spaces each have a unique object positioned therein, wherein a user of said entertainment device may randomly choose any one of the spaces after which the same may be cleared upon the depression of a button.

6. A child educational entertainment device as set forth in claim 5 wherein the control means transmits a sound signal to a speaker when the button is depressed to clear one of the spaces.

7. A child educational entertainment device as set forth in claim 5 wherein the object is an alphabetical letter.

8. A child educational entertainment device as set forth in claim 5 wherein the object is graphic representation of an errand.

9. A child educational entertainment device as set forth in claim 2 and further including a light actuator button for actuating a light of the display, wherein said light is actuated when said light actuator button is depressed.

* * * * *